US008776482B2

(12) United States Patent
Drenguis

(10) Patent No.: US 8,776,482 B2
(45) Date of Patent: Jul. 15, 2014

(54) CONTAINER TREATMENT MACHINE WITH A PASSAGE FOR PASSING

(75) Inventor: Alfred Drenguis, Börnsen (DE)

(73) Assignee: KHS GmbH, Dortmund (DE)

( * ) Notice: Subject to any disclaimer, the term of this patent is extended or adjusted under 35 U.S.C. 154(b) by 611 days.

(21) Appl. No.: 12/995,418

(22) PCT Filed: Jul. 10, 2009

(86) PCT No.: PCT/EP2009/005001
§ 371 (c)(1), (2), (4) Date: Nov. 30, 2010

(87) PCT Pub. No.: WO2010/009817
PCT Pub. Date: Jan. 28, 2010

(65) Prior Publication Data

US 2011/0072760 A1 Mar. 31, 2011

(30) Foreign Application Priority Data

Jul. 23, 2008 (DE) ......................... 10 2008 034 389

(51) Int. Cl.
*B65B 31/02* (2006.01)
*F16J 15/16* (2006.01)

(52) U.S. Cl.
USPC .................. 53/167; 53/306; 53/272; 53/281; 53/317

(58) Field of Classification Search
USPC .......... 53/167, 306, 308, 272, 300, 317, 281, 53/331.5
See application file for complete search history.

(56) References Cited

U.S. PATENT DOCUMENTS

| | | | | | |
|---|---|---|---|---|---|
| 3,799,220 | A * | 3/1974 | Berry et al. | | 141/46 |
| 5,157,961 | A * | 10/1992 | Bialsky et al. | | 73/53.01 |
| 5,848,515 | A * | 12/1998 | Catelli et al. | | 53/167 |
| 6,105,634 | A | 8/2000 | Liebram et al. | | |
| 6,495,111 | B2 | 12/2002 | Kurth | | |
| 7,121,062 | B2 * | 10/2006 | Till | | 53/167 |
| 7,409,808 | B2 | 8/2008 | Till et al. | | |
| 2002/0178689 | A1 * | 12/2002 | Nervo | | 53/167 |
| 2007/0193652 | A1 * | 8/2007 | Till et al. | | 141/144 |
| 2011/0072762 | A1 * | 3/2011 | Jakob | | 53/285 |

FOREIGN PATENT DOCUMENTS

| | | |
|---|---|---|
| DE | 19808236 | 9/1999 |
| DE | 102006007481 | 7/2007 |
| EP | 1122170 | 8/2001 |

* cited by examiner

*Primary Examiner* — Hemant M Desai
(74) *Attorney, Agent, or Firm* — Occhiuti & Rohlicek LLP

(57) ABSTRACT

A passage for the sealed and/or sterile passage of a functional element (15), for example a rod and/or wave-like functional element through at least one wall (6) separating a sterile chamber (5) from an non-sterile chamber, comprising at least one hydraulic seal (20) enabling a relative movement of the functional element (15) in relation to the at least one wall (6).

16 Claims, 4 Drawing Sheets

CONTAINER TREATMENT MACHINE WITH A PASSAGE FOR PASSING

CROSS-REFERENCE TO RELATED APPLICATIONS

This application is the National Stage of International Application No. PCT/EP2009/005001, filed on Jul. 10, 2009, which claims the benefit of German Application Serial No. 10 2008 034 389.7, filed on Jul. 23, 2008, the contents of both of the foregoing applications are hereby incorporated by reference in their entirety.

The invention relates to container-treatment machines, and in particular, to an apparatus defining a passage for passing, in a sealed and/or sterile manner, a functional element through a wall that separates a sterile space from a non-sterile space in a container-treatment machine.

FIELD OF INVENTION

Background

Especially in the case of container treatment machines for the aseptic or sterile treatment of bottles or similar containers, e.g. in the case of closing machines for the aseptic or sterile closing of bottles or containers, in many cases there is the problem of having to pass the rotatingly driven and/or axially moved and/or radially moved, rod-like and/or shaft-like function element in a sealed and sterile manner through an enclosure that separates a non-sterile space from a sterile space or through a separating wall that separates the non-sterile space from the sterile space in order to accomplish the aseptic or sterile treatment, for example the filling and/or closing of the containers, in the sterile space. Said containers are accommodated in this case in the sterile space either completely or at least by way of a part portion that includes the container mouth.

SUMMARY

It is the object of the invention to provide a passage which makes it possible for the respective functional element to be passed in an absolutely sealed, sterile manner through a separating wall out of the non-sterile space above the enclosure or separating wall into a sterile space inside the enclosure or below the separating wall, with the possibility of a relative movement between the functional element and the separating wall.

Further developments, advantages and application possibilities of the invention are produced from both the following description of exemplary embodiments and from the Figures. In this case all the features described and/or graphically represented, individually or in arbitrary combination, are in principle objects of the invention, irrespective of their summary in the claims or their dependency. The content of the claims is also made a component part of the description.

BRIEF DESCRIPTION OF THE FIGURES

The invention is explained below by way of the Figures of an exemplary embodiment, in which, in detail.

DETAILED DESCRIPTION

Figure 1:
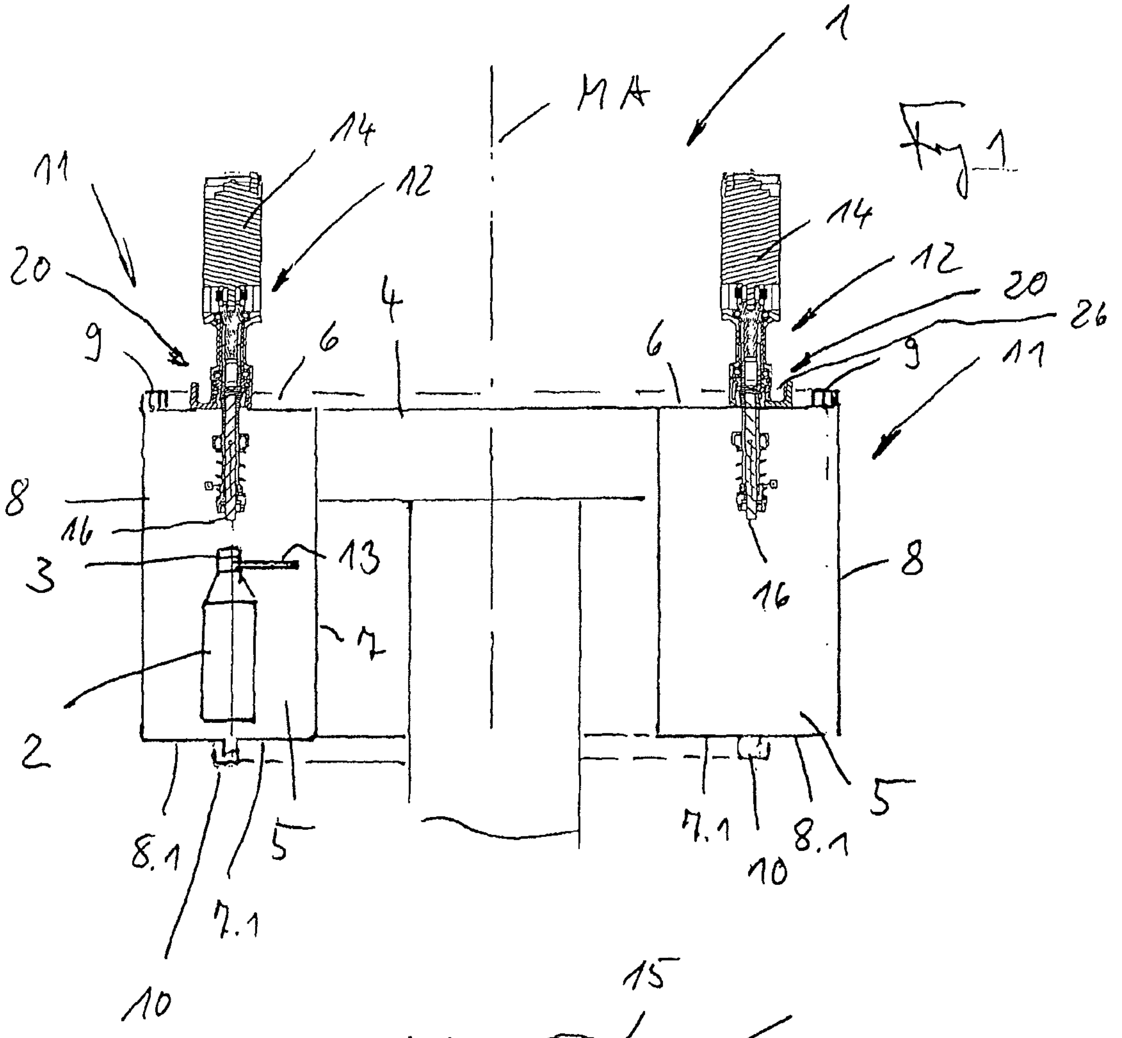
FIG. 1 shows a simplified, sectional representation of a closing machine of the rotating type for closing bottles or similar containers by way of screw-type closures.

The closing machine, given the general reference of 1 in FIG. 1, is used for closing bottles 2 by way of closures 3 that are in the form of screw-connectable closures or caps. For this purpose, the closing machine 1 comprises a rotor 4 that is rotatingly driveable about a vertical machine axis MA, a ring-channel-like sterile space 5 that surrounds the machine axis MA in a concentric manner being provided on the periphery of said rotor, said sterile space being formed within an enclosure and being defined by a plurality of walls in relation to the surrounding area, i.e. in relation to the non-sterile space formed by the surrounding area, in the case of the schematic representation in FIG. 1 by an upper wall 6, by a wall 7 lying radially inside with reference to the machine axis MA and surrounding the machine axis MA in a ring-shaped manner, by a wall 8 lying radially outside with reference to the machine axis MA and surrounding the machine axis MA in a concentric manner and on the underside by portions 7.1 or 8.1 of the walls 7 and 8. The walls 6 and 7 including the portion 7.1 are provided on the rotor 4 so as to rotate with said rotor. The wall 8 including the portion 8.1 is provided on a machine frame of the closing machine 1 so as not to rotate with the rotor. At the transitions between the walls 6 and 8 and the portions 7.1 and 8.1 there is provided in each case a seal 9 or 10, for example a hydraulic seal or siphon seal, such that the sterile space 5 is separated in a sealing manner by the walls 6-8 and the associated seals 9 and 10 from the surrounding area or from the non-sterile space.

For closing the bottles 2 by way of the closures 3, a plurality of closing stations 11 are formed on the periphery of the rotor 4, only two of which are represented in FIG. 1 and they are provided distributed at regular angular spacings about the machine axis MA. Each closing station 11 comprises a closing tool 12, by means of which the respective closure 3 is screw-connected to the bottle 2, which is held by way of its bottle mouth below the closing tool 12 on a container carrier 13 and is accommodated completely in the sterile space 5. In the case of the embodiment represented, the bottles 2 are held in a suspended manner on the respective container carrier 13, which is height-controlled by a control cam (not shown), at a container flange that is realized below the bottle mouth.

The respective closing tool 12 is realized as a screw-type closing means and comprises, among other things, a, for example, electromotive drive 14, a spindle 15 which is oriented with its axis parallel to the machine axis MA and is connected by way of its top end in a driving manner to the drive 14 or to the motor shaft of said drive, and a closing head 16, which is axially spring-loaded at the bottom end, by mean of which closing head, with the rotor 4 rotating, the respective closure 3 is removed from a closure transfer position (not shown), is then fitted onto the bottle mouth by raising the respective bottle 2 against the closing head 16 and is then screw-connected to the relevant bottle 2 via the closing head 16 that is driven by the drive 14 via the spindle 15, in a manner that is known to the expert.

Figure 2:
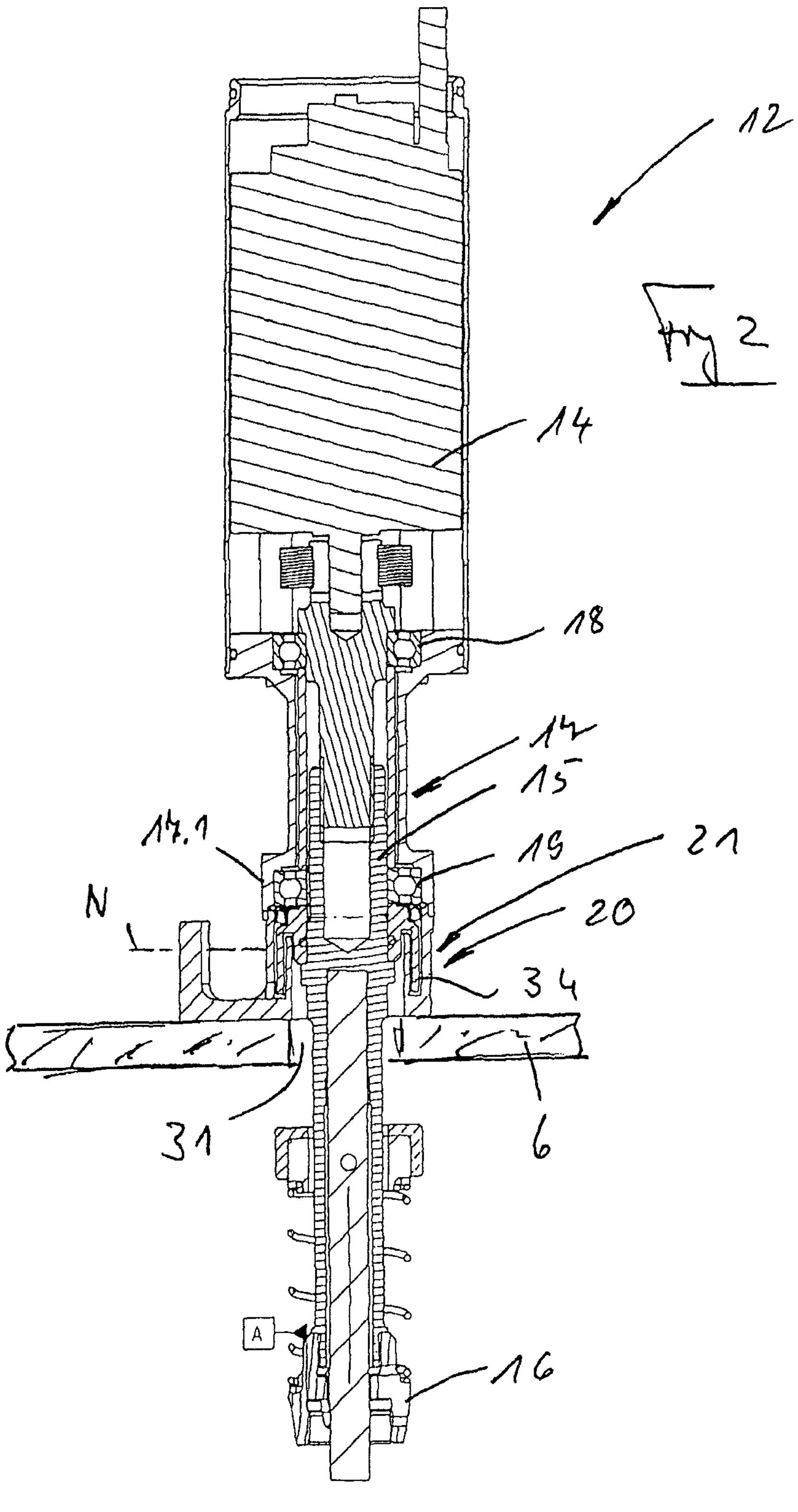
FIG. 2 shows a simplified, sectional representation of a detail of one of the closing tools of the closing machine in FIG. 1.
Figure 3:
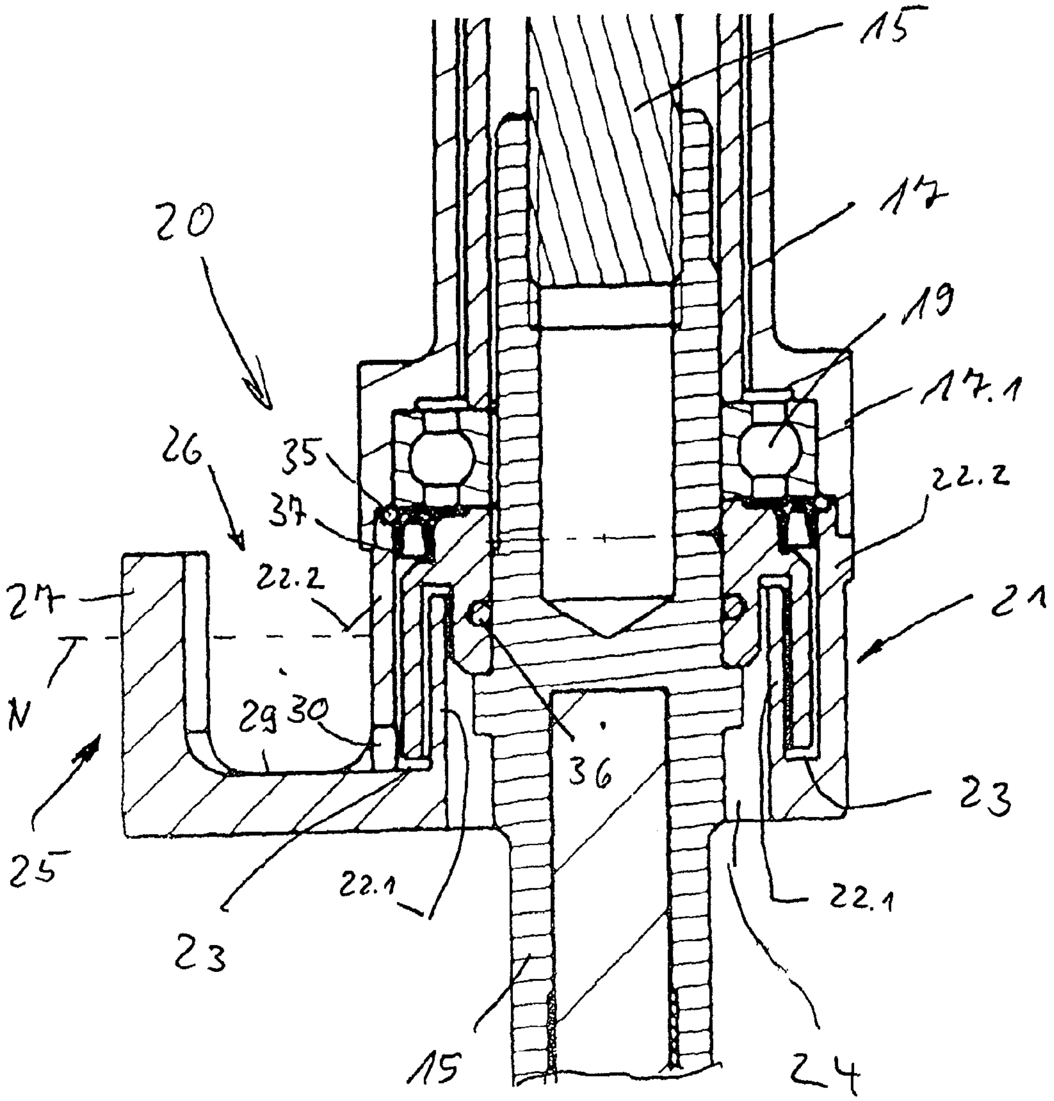
FIG. 3 shows a representation of a detail of the hydraulic seal or siphon seal in the region of the passage of a spindle through a wall of the closing machine in FIG. 1 separating a sterile space from a non-sterile space that is situated above said sterile space.
Figure 4:
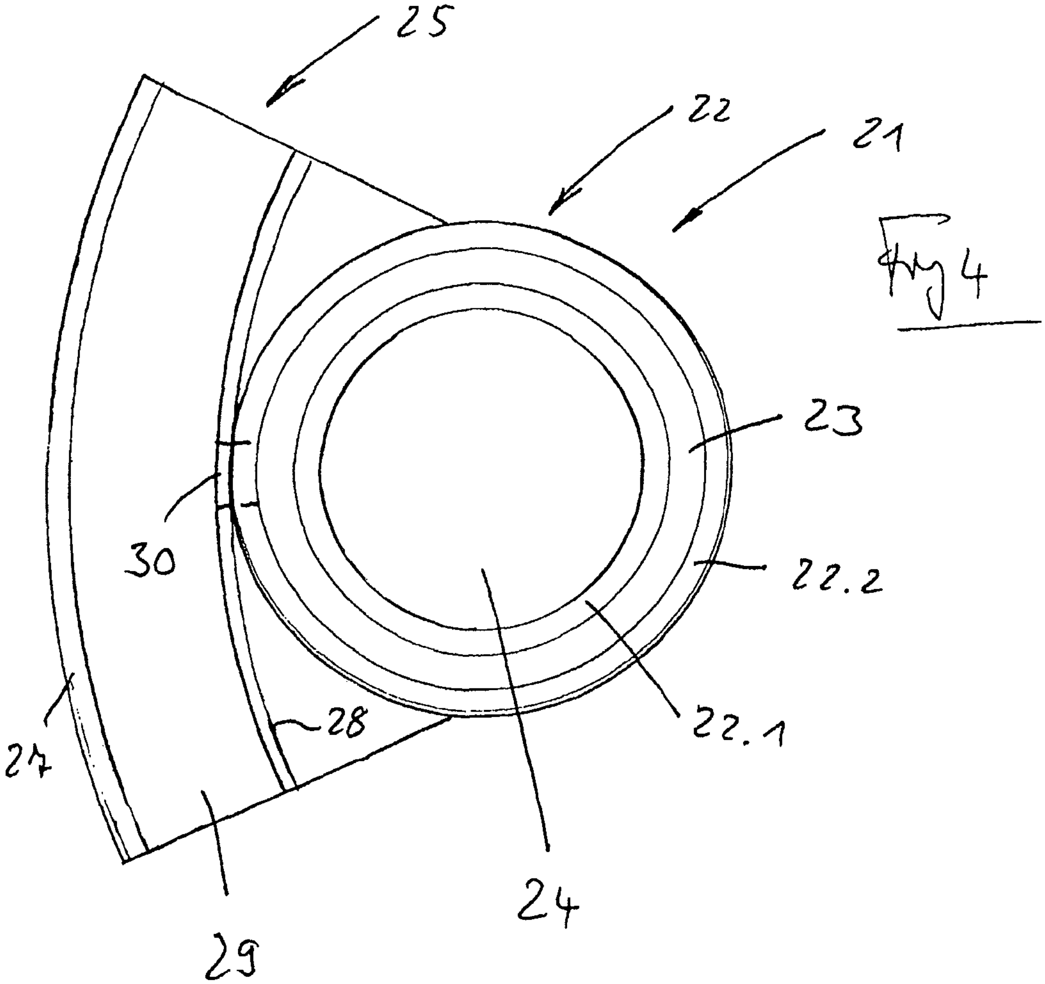
FIG. 4 shows a top view of one of the two sealing elements of the hydraulic seal in FIG. 3.

As is shown in FIGS. 1 and 2, the drive 14 and a tubular housing 17, in which the spindle 15 in the embodiment represented is mounted at two bearings (upper bearing 18 and lower bearing 19) and which connects axially to said drive and accommodates an upper part length of the spindle 15, are situated outside the sterile space 5 and above the wall 6. The particular problem here is to pass the spindle 15 through the wall 6 in a sealed manner. For this purpose a hydraulic seal or siphon seal, given the general reference 20 in the Figures, is provided for each closing station 11 on the top side of the wall 6. Said seal comprises, among other things, a sealing element 21 that is realized as a moulded body produced from a suitable material, for example metal. As is clearly shown in particular in FIG. 4, the sealing element 21 includes a cup-like portion 22, which is open at the top side, has two wall portions 22.1 and 22.2 that are located concentrically to each other and, in the embodiment represented, are circular cylindrical, said wall portions, between each other, forming a ring channel 23, which is the sealing space of the siphon seal 20 and is closed at the underside of the portion 22 or of the moulded body 21 and is open at the top side of the portion 22 or of the moulded body 21. The inner wall portion 22.1 surrounds an opening 24, through which the spindle 15 is passed through the sealing element 21 or the siphon seal 20. In addition, the height of the inner wall portion 22.1 is reduced in comparison to that of the outer wall portion 22.2.

The sealing element 21, in addition, is realized with a portion or groove segment 25 moulded on the portion 22, which portion or groove segment is open on the top side of the moulded body 21 and is defined by two wall portions 27 and 28 and a bottom 29. The portion 25 or its wall portions 27 and 28 are curved in an arcuate manner such that the portions 25 of the closing stations 11 or of the hydraulic seals 20 of said stations connecting to one another in the circumferential direction of the rotor 4 form a ring channel 26, which is made up of the portions 25 or segments, surrounds the machine axis MA in a concentric manner, is open at the top and, with reference to the machine axis, surrounds the portions 22 and consequently the spindles 15 that are passed through the openings 24 in said portions on the outside.

The height of the wall sections 27 and 28 in the axial direction perpendicular to the bottom 29 and consequently in the installed state in the axial direction parallel to the machine axis MA is, for example, identical to the corresponding height of the outer wall portion 22.2. The groove segment 26 communicates via an opening 30 with the ring channel 23. The opening 30, in this case, is situated in the region of the bottom 29 of the groove segment 25 that is located at the same level or approximately at the same level as the bottom of the ring channel 23.

In the mounted state, the moulded body 21 of each hydraulic seal 20 is secured to the top side of the wall 6 in the region of an opening 31 provided in said wall in such a manner that the opening 24 coincides with the opening 31 and the ring channel 23 and the groove segment 25 are each open towards the top side remote from the wall 6.

In the mounted state, the housing 17 is sealingly connected by way of a housing portion 17.1 that has the bottom bearing 19 to the outer housing portion 22.2 at the top side of said wall portion.

Figure 5:
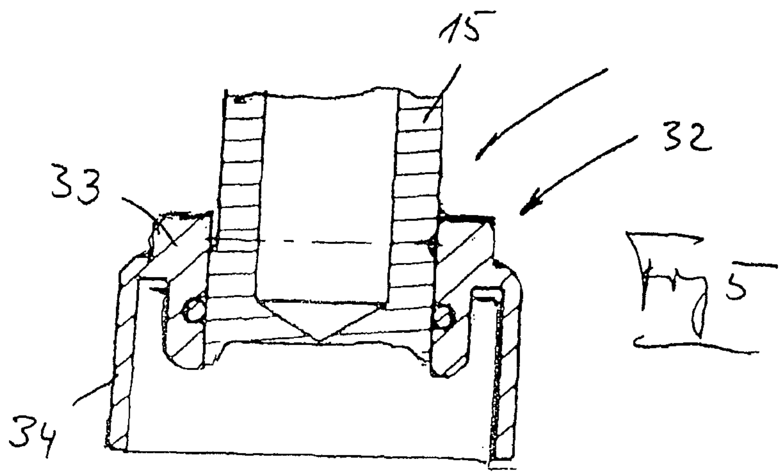
FIG. 5 shows a representation of a detail of the additional sealing element of the hydraulic seal in FIG. 3.

A component part of each hydraulic seal 20, in addition, is a cup-like or bell-like sealing element 32, which is realized as a moulded part and, as can also be seen in detail in particular in FIG. 5, comprises a ring-shaped portion 33, which in the mounted state is secured on the spindle 15 engaging around said spindle, and a circular cylindrical portion 34, which in the mounted state surrounds the axis of the spindle 15 in a concentric manner and at a radial spacing and at its upper end merges into the ring-shaped portion 33. The portion 34 is realized such that, in the mounted state of the respective hydraulic seal 20, said portion extends into the ring channel 23 of the sealing element 21 in such a manner that the circular cylindrical inside surface and the equally circular cylindrical outside surface of the portion 34 is at a spacing from the inside surface of the wall portions 22.1 and 22.2 and the bottom free end of the portion 34 is at a spacing from the bottom of the ring channel 23.

Each hydraulic seal 20, in addition, has a plurality of mechanical sealing elements, in the embodiment represented a sealing ring 35, which seals off the transition between the housing portion 17.3 and the upper edge of the wall portion 22.2, a sealing ring 36 which seals off the gap between the portion 33 and the outside surface of the spindle 17, and a ring-shaped sealing element 37 which is realized for example with at least one stripping lip between the portion 33 of the sealing element of moulded part 32 rotating with the spindle 17 and the inside surface of the outer wall 222 in the upper region of said wall. Additional seals (not shown) are provided between the individual groove segments 25 that connect to one another in order to create, in this manner, a liquid-tight groove 26 that is made up of said groove segments 25.

During operation, the groove 26, formed by the groove segments 25 and surrounding the machine axis MA in a concentric manner, and consequently via the openings 30 also the respective volume of the ring channel 23 of each hydraulic seal 26 not occupied by the portion 34 of the sealing element 32, are filled up to a level N with a liquid sealing or sterilizing medium, said level N being somewhat below the level of the upper edge of the inner wall portion 22.1. The portion 34 extending into the respective ring channel 23 and the liquid sealing or sterilizing medium accommodated in the ring channel 23 produce a reliable siphon-like sealing in the region of the passage of the spindle 15 at each closing station 11. The level N of the sealing or sterilizing medium is maintained in a controlled or regulated manner for example via a level-controlled supply unit (not shown).

The invention has been described above by way of an exemplary embodiment. It is obvious that numerous modifications or conversions are possible without in any way departing from the inventive concept underlying the invention. Thus, it has been assumed above that the seals 20 are used for passing the spindles 15 through in a sealed manner, rotating about their spindle axes. Obviously seals 20 or the passages having said seals can also be realized for an axial and/or radial movement of the spindle 15 or of another functional element of a closing station, in particular with corresponding adaptation of the axial dimensions of the sealing elements 21 and 32, i.e. in particular the height of the wall portions 22.1, 22.2, 27, 28, and in particular through corresponding adaptation of the axial dimensions of the circular cylindrical portion 34.

The hydraulic seal 20 ensures that the spindle 15 is passed through the wall 6 in a totally sealed, sterile manner, in particular also by the liquid sealing and/or sterilizing medium accommodated in the ring channel 23 forming a block which extends around the entire portion 34 that is immersed into said sealing and/or sterilizing medium. With the exception of the sealing element 37 that abuts against the inside surface of the wall portion 22.1, the sealing is effected without any contact between the sealing elements 21 and 32.

In addition, the seal or passage according to the invention is obviously not only suitable for use with closing machines, but also for use with other container treatment machines where, for example, a rotating and/or axially and/or radially moveable functional element extends by way of a part portion from the surrounding area or from a non-sterile space from above into a sterile space.

LIST OF REFERENCES

1 Closing machine
2 Bottle
3 Closure
4 Rotor
5 Sterile space
6, 7, 8 Wall
7.1, 8.1 Portion of the wall 7 or 8
9, 10 Seal
11 Closing station
12 Closing tool or screw-type closing means
13 Container carrier
14 Drive of the closing tool
15 Spindle
16 Closing head
17 Housing
17.1 Housing portion
18, 19 Bearing
20 Hydraulic sealing unit
21 Sealing element or moulded body
22 Portions of the moulded body 21
22.1, 22.2 Wall portion
23 Ring channel
24 Opening
25 Portion or groove segment
26 Groove
27, 28 Wall portion
29 Bottom
30 Opening or connection
31 Opening
32 Sealing element or moulded body
33, 34 Portion of the sealing element
35, 36 Sealing ring
37 Seal
N Level of the sealing or sterilizing medium

The invention claimed is:

1. An apparatus defining a passage for passing, in a sealed and/or sterile manner, a functional element through a wall that separates a sterile space from a non-sterile space, said apparatus comprising: a hydraulic seal that enables movement of the functional element relative to the wall, the hydraulic seal having a first cup-like and/or bell-like sealing element, said sealing element being securable to the functional element, surrounding said functional element in a sealing manner, and, by way of a side facing the sterile space for forming a siphon seal, extending into a sealing space that is used for accommodating a medium selected from the group consisting of a liquid sealing medium and a sterilizing medium.

2. The apparatus of claim 1, further comprising a second sealing element for realizing said sealing space.

3. The apparatus of claim 2, wherein the second sealing element defines the sealing space as a ring channel that surrounds an axis of the functional element, and wherein the first sealing element extends into said ring channel.

4. The apparatus of claim 2, wherein the first sealing element extends into the sealing space from an open side remote from the sterile space.

5. The apparatus of claim 2, wherein the first and second sealing elements provide a hydraulic seal on a side of the wall.

6. The apparatus of claim 1, wherein the hydraulic seal is provided on a side of the wall.

7. The apparatus of claim 1, wherein the first sealing element comprises: a ring-shaped securing portion that is securable to the functional element, and an additional portion that surrounds the functional element at a spacing and extends into the sealing space, said additional portion being a substantially circular cylindrical portion.

8. The apparatus of claim 1, wherein the sealing space communicates with a channel or a groove for accommodating the medium.

9. The apparatus of claim 8, wherein the passage is one of a plurality of passages, each passage in the plurality of passages being provided or realized with a seal, and wherein a common channel or a common groove is provided for the medium and in fluid communication with said passage.

10. The apparatus of claim 8, wherein a second sealing element is realized in one piece with a channel segment or groove segment that, in cooperation with a channel segment or groove segment of an additional passage, forms the common channel or common groove.

11. The apparatus according to claim 1, wherein the functional element comprises a rotatingly drivable and/or axially displaceable shaft or spindle of a closing tool of a closing machine for closing containers.

12. The apparatus of claim 1, further comprising a circulating rotor inside the sterile space; and a plurality of treatment stations formed on the circulating rotor, each of which accommodates a container at least in the region of a container mouth, each of said treatment stations having a functional element passing through the wall, said functional element being moveable relative to said wall by using a passage defined by said hydraulic seal.

13. The apparatus of claim 12, wherein the treatment stations are closing machines, and each functional element is a component part of a corresponding closing tool.

14. The apparatus of claim 13, wherein each functional element comprises a rotatingly drivable and/or axially displaceable push rod or spindle of a closing tool.

15. The apparatus of claim 13, wherein each functional element comprises a rotatingly drivable and/or axially displaceable push rod or spindle of a closing tool for closing containers using a screw-type closure.

16. The apparatus of claim 1, wherein the functional element is a shaft-like functional element.

* * * * *